United States Patent [19]

Hoover et al.

[11] Patent Number: 4,712,326
[45] Date of Patent: Dec. 15, 1987

[54] NOISEMAKING FISHING LURE

[76] Inventors: Gary W. Hoover, Rte. 1, Box 47, Pleasant Hill, Mo. 64080; Geuane Empson, 9216 Stubbs Rd., Kansas City, Mo. 64138; Bruce W. Ashley, 5007 Manchester, Kansas City, Mo. 64129

[21] Appl. No.: 885,464

[22] Filed: Jul. 14, 1986

[51] Int. Cl.$^4$ ............................................. A01K 85/00
[52] U.S. Cl. ................................ 43/42.31; 43/42.36; 43/42.39
[58] Field of Search ................. 43/42.31, 42.36, 42.39, 43/42.37, 44.96, 44.97, 17.6, 44.81, 43.16

[56] References Cited

U.S. PATENT DOCUMENTS

| | | | |
|---|---|---|---|
| 1,870,559 | 8/1932 | Drake | 43/42.31 |
| 2,659,176 | 11/1953 | Wenger | 43/42.31 |
| 3,044,207 | 7/1962 | Dorsett | 43/42.31 |
| 3,068,604 | 12/1962 | Nyberg | 43/42.31 |
| 3,191,336 | 6/1965 | Cordell | 43/42.37 |
| 3,497,987 | 3/1970 | Perrin | 43/42.37 |
| 3,848,353 | 1/1974 | McClellan | 43/42.31 |
| 3,905,147 | 9/1975 | Snipes | 43/42.06 |
| 3,908,298 | 9/1973 | Strader | 43/42.31 |
| 3,909,974 | 10/1975 | Kent | 43/42.37 |
| 3,935,660 | 2/1976 | Plew | 43/42.31 |
| 4,045,903 | 9/1977 | Parker | 43/42.11 |

Primary Examiner—Nicholas P. Godici
Assistant Examiner—Karen Skillman
Attorney, Agent, or Firm—Thomas M. Scofield

[57] ABSTRACT

An improved jig type fishing lure, the weight including a noisemaker; a fishing hook having a lead weight cast on the end thereof opposite the bend and point, the weight having formed therein an elongate cavity to receive a noisemaking pellet, the noisemaking pellet sealed in the cavity by a cap held in place by displaced material of the weight; relatively massive weights cast around the eye end of fishing hooks with an elongate cavity formed within the weight to receive a noisemaking ball or pellet, the cavity formed in the weight running substantially parallel with the shank of the hook and being sealed by a cap held in place by the displaced material of the weight.

3 Claims, 6 Drawing Figures

U.S. Patent  Dec. 15, 1987  Sheet 1 of 1  4,712,326
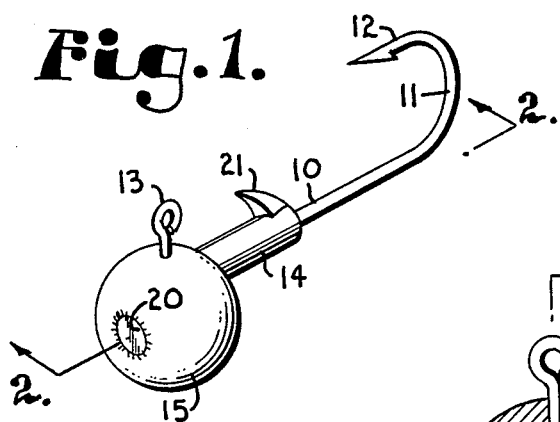
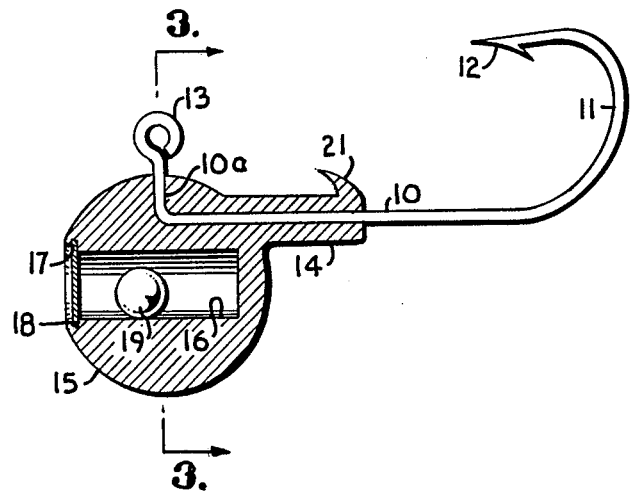
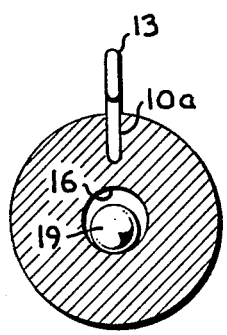
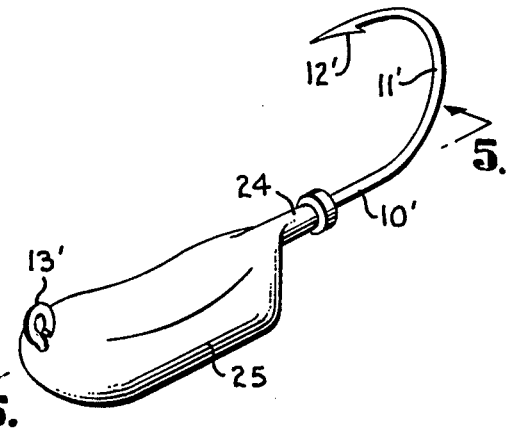
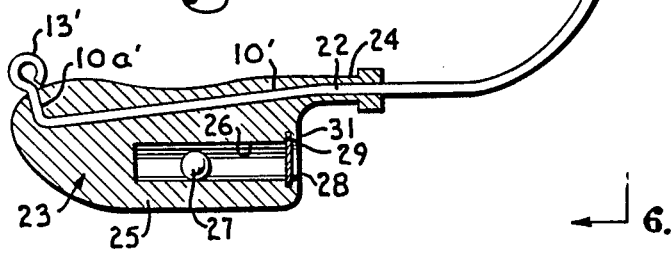
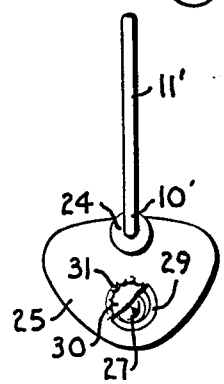

NOISEMAKING FISHING LURE

BACKGROUND OF THE INVENTION

Noisemaking lures of the most varied sort are known to the prior art. Various noisemaker devices may be used with such baits and lures of the most varied sort and may be placed at various positions on the bait or in the bait. Often, however, the noisemaker is inconvenient to manufacture or supply in, on or with respect to a given bait. Noisemakers typically comprise a pellet, ball, shot or round object in a cavity in the lure body which moves around in the cavity, striking the end surfaces or various surfaces within the body as the lure moves in the water, thus making a noise. Noisemaking chambers may also be fabricated independently and be attached anywhere on the parts of a lure.

What is most desirable in a noisemaker for a jig type lure or bait is that it be conveniently positioned or provided in the head of the bait, that it be extremely effective, that is, that it effectively make noise in motion of the bait in and through the water and that it be extremely durable and functional over a long period of time.

BRIEF DESCRIPTION OF THE INVENTION

The subject device comprises a weighted, noisemaking jig type fishing lure. The device basically comprises a weighted hook having an elongate shank, an eye at one end of the hook and a bend portion and a point at the other end thereof as a base. A lead weight is cast on the shank of the hook at or along the eye end thereof adjacent to the eye. The eye portion of the hook and the shank next thereto may be bent to a greater or lesser degree (typically up to 90°) in the same plane as the bend and point of the hook.

The lead weight has essentially two portions thereof. A first portion of said weight is positioned relatively far from said eye and comprises a sleeve, optionally an elongate sleeve, embracing and encircling a portion of said hook shank. The second portion of the weight is positioned relatively adjacent to said eye and relatively far from the bend of the hook. The second portion is an enlarged, thickened portion of considerably greater thickness than said sleeve. The thickened portion is positioned on the shank in a direction opposite to the direction of the extension of the hook bend and the position of the hook point. The purpose of this is to clear the hook bend and hook for fish catching purposes.

A cavity is formed in said weight second portion. The cavity has a deeper inward part or length of lesser internal diameter and a shallower outer portion of greater internal diameter, thereby to form a shelf at the outer portion of the cavity. At least one lead or other pellet is positioned in said cavity operative to roll to and fro therewithin and to impact on the end closures of the cavity. The cavity is closed by a cap or lid placed on said shelf of the cavity with the material of the outer portion around and outside of said shelf being deformed down onto the edge of the cap, thereby to retain the cap on the shelf.

The cavity may extend from the eye end of the shank toward the hook end or hook bend end of the hook towards the eye. In the first such case, the second portion of the weight is preferably substantially spherical in form. In all cases, the cavity is below the elongate portion of the hook shank and in a plane opposite the hook bend and the eye bend, if there is an eye bend. In the event the cavity opens from the hook bend end of the second portion of the weight and extends toward the eye portion of the hook, the weight is preferably more elongate and cylindrical or triangular in transverse section.

THE PRIOR ART

Applicant is aware of the following patents directed to noisemakers applied to fishing lures.

Drake U.S. Pat. No. 1,870,559, issued Aug. 9, 1932 "Artificial Bait";

Dorsett U.S. Pat. No. 3,044,207 "Artificial Fishing Lure", issued July 17, 1962;

Cordell, Jr. U.S. Pat. No. 3,191.336, issued June 29, 1965 for "Fishing Lure . . . ";

Bunker U.S. Pat. No. 2,763,954 "Fishing Lure", issued Sept. 25, 1956;

McClellan U.S. Pat. No. 3,848,353, issued Nov. 19, 1974 for "Rattle Sounder . . . ";

Snipes U.S. Pat. No. 3,905,147, issued Sept. 16, 1975 for "Fishing Lure";

Strader U.S. Pat. No. 3,908,298, issued Sept. 30, 1975 for "Fishing Lure";

Plew U.S. Pat. No. 3,935,660, issued Feb. 3, 1976 for "Noisemaking Device"; and

Parker U.S. Pat. No. 4,045,903, issued Sept. 6, 1977 for "Artificial Fishing Lure".

OBJECTS OF THE INVENTION

A first object of the invention is to provide improved noisemaking in a jig type fishing lures.

Another object of the invention is to provide improved noisemaking for jig type fishing lures which are received in weights molded around portions of the fish hook;

A third object of the invention is to provide improved methods of furnishing noisemaking jig type fishing lures where the noisemaking is within the weights themselves.

Another object of the invention is to provide improved methods of closing and sealing cavities formed in weights making up a part of jig type fishing lures.

Yet another object of the invention is to provide improved weights for casting on fish hooks for use in jig type fishing lures wherein the cavities may open either from front or rear of the weight and still be closed and sealed in the same manner.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIG. 1 is a three-quarter perspective view from above of a first form of the invention with the weight near the viewer in the view.

FIG. 2 is a view taken along the line 2—2 of FIG. 1 in the direction of the arrows.

FIG. 3 is a view taken along the line 3—3 of FIG. 2 in the direction of the arrows.

FIG. 4 is a three-quarter perspective view from above of a second form of weight/hook construction FIG. 5 is a view taken along the line 5—5 of FIG. 4 in the direction of the arrows.

FIG. 6 is a view taken along the line 6—6 of FIG. 5 in the direction of the arrows.

STRUCTURE AND FUNCTION

Referring to the drawings and particularly to FIGS. 1-3, inclusive, therein is seen a first form of the invention where the cavity to receive the noisemaker pellet enters the weight from the eye or eyelet end of the hook. In these figures, there is seen a hook having an elongate shank portion 10, a bend portion 11, a point portion 12 and an eye or eyelet portion 13. As may be seen in FIG. 2, the shank portion 10a next to the eye or eyelet 13 has been formed or bent upwardly at right angles to main shank portion 10 in the same plane as the bend 11 of the hook.

This hook has a lead weight cast on the shank portions 10 and 10a toward or near the eyelet 13. This weight has, basically, two portions. A first portion 14 extends along a portion of the length of shank 10 of the hook, the second portion 15 being a substantially spherical ball of lead or other equivalent material. Equivalent material means weighted or weighting material which may be cast so as to have a cavity formed therein and, yet further, have the edges thereof formed inwardly and downwardly by impact as will be described. Lead is the best material for this. Portion 14 permits mounting of a skirt or streamers (not shown) thereon in conventional manner.

Cast into body 15 is a cylindrical cavity 16 which extends a substantial proportion of the length of ball 15 and is preferably bisected by the plane through the hook elements 11 and 10a. At the entry of cavity 16 into ball 15, there is cast a larger internal diameter portion 17, thus to provide shelf 18. Shot, ball or pellet 19 is received within cavity 16 and may roll back and forth therewithin and rattle against the interior wall of the cavity, as well as the end walls. A flat cap, disc or lid 20 is placeable on the platform or shelf 18, such being of substantially the same outer diameter as the internal diameter at 17, whereby the soft lead walls of the cavity 17 portion may be hammered, tapped or forced inwardly on the periphery of the cap, thus to seal same, water tight, so the ball 19 may freely move within cavity 16 under water.

In this form of the invention, a considerable part of the weight and the cavity 16 extend beyond the eyelet 13 portion of the hook. One of the reasons for the extension at right angles of shank portion 10a with respect to shank 10 is to clear the zone around the wall 17 portion so that this area is clear for striking the circumference of wall 17 in order to engage the cap and close the cavity. Eyelet 13 could be substantially in line with shank 10, at a 30°, 45°, 60°, etc. angle thereto or as shown. As shown is preferred. The ball of the weight is positioned opposite eyelet 13 and hook point 12 in order to clear the zone leading into the hook for fish catching purposes. The upward extension 21 may be just a method of providing additional weight in that portion of the hook assembly or may be used in a part of a lure assembly to receive a trailing skirt or the like. A brush-like weed deflector (not seen) may be provided in the top of ball 15 to approach or overlie point 12 in known or conventional fashion.

Referring to FIGS. 4-6, inclusive, therein is shown a hook having the same structural elements as previously described Accordingly, all of the same parts of the hook are numbered the same as in FIGS. 1-3, inclusive, but primed. There is but a single difference shown in this hook and that is that the hook shank 10' has a slight bend as seen at 22. This is entirely optional and the hook shank may be entirely straight (preferably is so) and the weight to be described molded along the straight shank. The alternative bend gives greater openness or clearance to the hook with respect to the eyelet 13'.

Weight 23 is provided with a first portion 24 which is molded or cast along the shank length 10' toward the hook bend. The purpose of part 24 is to receive a skirt or streamers in conventional fashion. The second portion of the weight as at 25 is an elongate body which is roughly an inverted triangle (see FIG. 6) in end view or vertical section with respect to the views of this application.

Provided in body 25 is an elongate conduit or channel 26 operative to receive ball, pellet or shot 27. A greater internal diameter circular outer portion 28 is again provided with shelf 29 at the interface between channel 26 and recess 28. Cap or lid 30 may be seen closing the conduit or channel 26 (FIG. 6) by being inserted into recess 28 on shelf 29 and the surrounding material 31 forced, pounded or hammered into place circumferentially around the edge of the cap or lid to seal same. A weed deflector brush may optionally be provided based in the top of body 23 which approaches or overlies point 12'.

Thus it is seen that a cast, weighted hook has been provided with the weight having a conduit or the channel therewithin for a ball, pellet or shot to move to and fro for noisemaking purposes. The weighted hook has been provided with the conduit or channel entering from front or rear with respect to the eyelet or hook bend. The material of the weight itself is used to seal the opening. High speed assembly is possible in this manner. The hook may be formed in any one of several ways with the eyelet at right angles to the hook shank as seen in FIGS. 2 and 5 or at a lesser angle or even greater angle thereto. The body of the weight is provided on the side of the hook opposite to or away from the hook and eye, yet in the plane through the hook bend and point, in this case also the eyelet shank and hook bend portions (as illustrated)

The described constructions may be employed by themselves, per se, as jig baits. That is, no camouflaging skirt or streamers need be fixed to body portions 14 and 24. Likewise, weed deflectors do not necessarily have to be used with these devices, the base of the weed deflector received in the thickened body portion on the top thereof and the free ends of the weed deflector elements approaching or overlying the hooks points 12 or 12'. Alternatively, one or both of these conventional features may be employed with this jig bait or lure. The basic improvement is to provide a jig type lure with a weight at the head of the hook shank and a noisemaking cavity in the weight running substantially parallel to the axis of the shank of the hook.

It is already known to provide a jig type lure with a weight at the head of the shank, a skirt on an extension of the weight down the shank, a weed deflector extending out of the top of the weight and a noisemaker in a sleeve attached to the portion of the shank extending from the weight to the bend of the hook. What I have provided are weight constructions wherein cavities to receive noisemaking pellets or balls are provided in a position opposite to the extension of the eye and the bend of the hook, as well as the point thereof. These cavities substantially parallel the axis of the shank to maximize the sound created in the action of the jig lure or bait.

As is well known, a jig lure or bait goes to the bottom or towards the bottom. Any lift inverts the lure. Thus the jig lure inverts every time the fisherman twitches his hand. This operates the noisemaker. I have further shown that noisemaking cavities can be provided in weights from either direction.

The operation of the noisemaker, once it is provided in the weight as I have shown, is the same as any noisemaker, specifically, the motion of the lure or bait causes the ball or pellet 19 or 27 to rattle in the cavity provided for it against the extremities of such cavity.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A weighted, noisemaking hook and body assembly for use as a jig type fishing lure comprising, in combination:
   a hook having an elongate, largely substantially straight shank, an eye at end of the shank and a bend portion and a terminal barbed point both positioned at the other end of the shank,
   a lead weight cast in the greater length portion thereof on the substantially straight shank portion and also along at least a portion of the eye end of the shank portion adjacent to the eye,
   said weight having essentially two portions thereof:
   a first weight portion being positioned relatively far from said eye end of the hook shank and comprising a substantially cylindrical sleeve embracing part of said hook shank portion away from said eye,
   and a second weight body portion positioned relatively adjacent to said eye and fartherest from the bend and barbed point of the hook, such second weight body portion being an enlarged, thickened body portion of considerably greater thickness than said hook shank and sleeve,
   the said thickened body portion being positioned on the outside surface of the hook shank away from the side thereof leading into the closed end of the hook bend and also leading into the interior side of the barbed hook point,
   a cavity formed in one end of said second weight body portion, said cavity having a first, straightly extending, cylindrical, deeper inward portion of relatively lesser uniform internal diameter and a shallower outermost second portion of greater internal diameter symmetrically encircling the outer end of said first inward cavity portion, whereby to form a circumferential shelf therebetween,
   the elongate extension of said first portion of said cavity being positioned substantially parallel to the hook shank portion next thereto and extending a substantial portion of the length of said second weight body portion,
   one spherical pellet positioned in said first cavity portion, said pellet being of lesser outer diameter than the internal diameter of said first cavity portion and operative to move and roll to and fro wherewithin as the orientation of the first cavity portion varies as the fisherman works the jig type fishing lure, thereby successively to impact on the inside surfaces of the inner and outer end closures of the said cavity,
   said cavity open and closed by a metallic cap placed on said cavity shelf with the material of the second portion of said cavity positioned around and outside of said shelf circumferentially formed downwardly on the peripheral outer edge of said cap, whereby to retain the cap on the said shelf in first cavity portion sealing fashion.

2. A hook and body assembly as in claim 1 wehrein the opening to said cavity in said second weight body portion is positioned at the end of said thickened body portion most adjacent said hook bend, said cavity running axially in a direction substantially parallel to the substantially straight shank portion of the hook which is received within said second weight body portion.

3. A hook and body assembly as in claim 1 wherein the opening into said elongate cavity is at a position on said thickened body portion positioned furtherest away from said hook bend, said cavity running axially in a direction substantially parallel to the substantially straight shank porion of the hook which is received within said second weight body portion

* * * * *